United States Patent [19]
Wheldon

[11] 3,750,985
[45] Aug. 7, 1973

[54] SIDE FORCE CONTROL DEVICES
[75] Inventor: Wilbert G. Wheldon, Palos Verdes Peninsula, Calif.
[73] Assignee: Northrop Corporation, Los Angeles, Calif.
[22] Filed: Feb. 12, 1971
[21] Appl. No.: 114,818

Related U.S. Application Data
[63] Continuation-in-part of Ser. No. 66,449, Aug. 24, 1970.

[52] U.S. Cl. ........... 244/83 R, 244/75 R, 244/77 E, 244/92, 318/586
[51] Int. Cl. ............................................. B64c 13/04
[58] Field of Search ............. 244/83 R, 83 C, 75 R, 244/76 R, 77 R, 77 A, 77 E, 87, 91, 92, 51; 318/586

[56] References Cited
UNITED STATES PATENTS
2,597,020    5/1952    Nissen .................................. 244/76

Primary Examiner—Milton Buchler
Assistant Examiner—Stephen G. Kunin
Attorney—Harold L. Fox and Willard M. Graham

[57] ABSTRACT

An airplane embodying devices functioning to provide an essentially true side force acting to alter the horizontal flight path of an airplane without sideslip and to avoid roll movements normally associated with maneuvers of this type.

2 Claims, 4 Drawing Figures

INVENTOR:
Wilbert G. Wheldon

AGENT

INVENTOR:
Wilbert G. Wheldon

Harold L. Fox
AGENT

SIDE FORCE CONTROL DEVICES

This application constitutes a continuation-in-part of copending patent application, Ser. No. 66,449, filed Aug. 24, 1970, entitled Direct Side Force Control Device.

The present invention relates to control surfaces for airplanes and more particularly to cooperating control surfaces enabling the airplane to make flat turns functioning to change the flight path without sideslip and roll movements normally associated with changes of this type.

It is sometimes desirable in the control of aircraft to maintain the wings level position thereof at such time as it is effecting an azimuthal change in its flight path. This is especially important in the control of military airplanes with a depressed reticle sight when making a dive bombing run since this method of operation prevents the pendulum motion of the optical sight when normal bank and turn steering corrections are made. This pendulum motion which degrades the pilot's ability to track accurately is caused by the banked airplane attitude which problem is minimized by the invention described herein.

Accordingly it is a principal object of the invention to provide an airplane incorporating controlled surfaces and control means whereby wings level stability of the airplane is maintained at such times as the flight path azimuth is altered without introducing any substantial rolling or sideslip.

Although the characteristic features of the present invention are particularly pointed out in the appended claims, the invention itself, and also the manner in which it may be carried out, will be better understood by referring to the following description taken in connection with the accompanying drawings forming a part of this application and in which:

Figure 1:
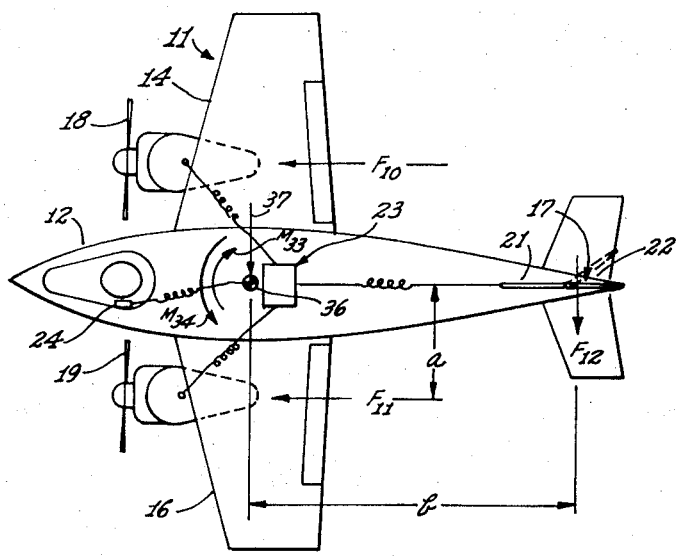
FIG. 1 is a plan view of an airplane incorporating variable pitch propellers cooperating with the rudder of the plane representing a method of providing the results as described herein.
Figure 4:
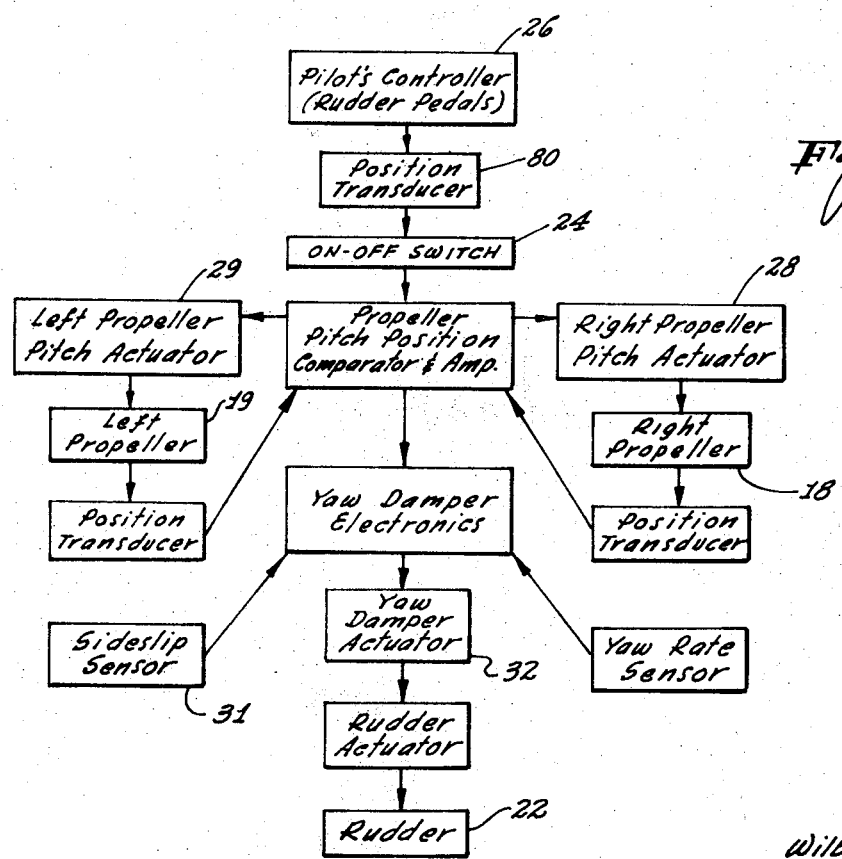

FIG. 4 constitutes a block diagram of the control devices cooperating with components described in FIG. 1.

Referring to the drawings and particularly to FIG. 1, in this figure a plan view of an airplane 11 is shown including a fuselage, right and left wings and tail empennage 12, 14, 16 and 17, respectively. The plane 11 is propelled by a pair of variable pitch propellers 18 and 19. The empennage 17 includes a vertical member 21 having a fixed relation with respect to the fuselage 12 and a conventional movable rudder member 22. However the members 21 and 22 may be of unitary construction, movable as a whole unit, and if so constructed are referred to as an all-movable tail.

The airplane 11 also includes internal control components 23 joining side force and yawing moment surfaces in a manner to be described as the disclosure progresses. FIG. 4 shows all of these control components. Among them are a switch 24 which the pilot places in the "on" position when desiring to operate the aircraft in the side force control mode. A position transducer 80 measures the pilot's inputs to the rudder pedal controller 26 signifying the direction which he wishes to turn the airplane. This controller 26 may alternatively be a twist-grip mounted at the top of the control stick or any other controller within the cockpit which may be provided as a pilot controller.

Lateral balance as used throughout the subject application refers to an airplane the wings of which remain in an unbanked attitude while the plane effects an azimuth change in its flight path, i.e., the change is effected without rolling or sideslip being imparted to the airplane 11 or the airplane 11 makes a "flat" turn.

For purposes of illustration it is assumed a dive bombing run is to be made. Referring to FIG. 4, a block diagram showing components of the internal control components is presented. Signals transmitted to the rudder 22 and pitch-changing devices to the propellers 18 and 19 originate with and are responsive to movements of the pilot's rudder pedals indicated by the numeral 26 (FIG. 4), when switch 24 is "on". These signals are transmitted to the devices controlling and amplifying the pitch control devices 28 and 29 which signals in turn are transmitted to the propellers 18 and 19, respectively. Positions assumed by the right and left propellers 18 and 19 are sensed and provide signals necessary to correctly position the rudder 22, as shown in dotted construction in FIG. 1, to balance the combined yawing moment from the propellers. The rudder is now producing a pure side force on the airplane 11 which accelerating force causes the airplane to make a "flat" turn. In so doing a small amount of sideslip is induced which is sensed by the sideslip sensor 31 and corrects the signal transmitted to the yaw damper actuator indicated by the numeral 32 which in turn corrects the rudder position to null the sideslip angle.

During a dive bombing run elimination of rolling action of an airplane will eliminate the pendulum effect of the depressed optical sight (not shown), thus tracking of a target will be rendered less difficult due to this improvement. Also target lead time needed utilizing the conventional rudder and aileron bank and turn maneuver is minimized. The flight means disclosed herein functions in a novel manner to eliminate or minimize these objections.

Referring again to FIG. 1, the forces acting on the airplane 11 will be better understood from the following explanation. It is assumed that the flight path of the airplane is to be altered to the left during the course of a bombing run. To effect this change the switch 24 is first moved to its "on" position energizing the internal control components 23 and operatively coupling the rudder pedals 26 to the present side force control system.

Then when the rudder pedals 26 are moved by the pilot in the normal left turn direction, the propeller pitch actuators 28 and 29 are operated to increase the pitch of the right propeller 18 and decrease the pitch of the left propeller 19.

The thrust of the right propeller 18 therefore increases and the thrust of the left propeller therefore decreases, resulting in the total change in thrust on the airplane 11 remaining essentially zero, but producing a left yaw movement. The sideslip sensor 31 in conjunction with the yaw damper 32 causes the rudder to deflect to the right to cancel the unbalanced yawing movement due to propeller pitch change, i.e., yawing moment due to propeller pitch change $(F_{10}-F_{11})a$ now equals opposite yawing moment due to rudder $(F_{12})(b)$ thus leaving only the unbalanced side force due to rudder force $F_{12}$ to the left (FIG. 1). This unbalanced side force is now a radial accelerating force which causes the airplane 11 to turn left essentially without banking. The moments $M_{33}$ and $M_{34}$ acting about the center of gravity 36, due to rudder and differential propeller change, respectively, being equal and opposite cancel each other, the linear side force $F_{12}$ can be transposed to the c.g. of the airplane 11 leaving only the force 37 which is equal to the force $F_{12}$. The force 37, acting through the c.g. of the airplane 11, along with the initial yaw motion caused by differential propeller thrust, results in a change in the azimuth flight path causing the airplane 11 to turn to the left in a flat turn.

When the airplane 11 assumes its desired new flight path the pilot eases off on the side force controller 26 (rudder pedals in this example) as desired to maintain proper tracking. Reference may be had to my co-pending application Ser. No. 66,449, filed Aug. 24, 1970, for further description of such controller.

Figure 2:
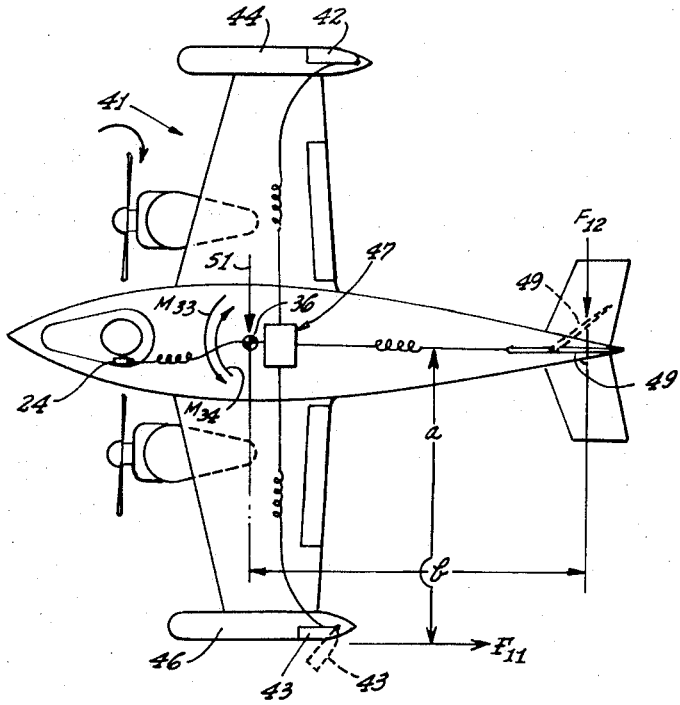
FIG. 2 is a plan view of an airplane incorporating control surfaces acting as asymmetric drag producing devices and cooperating with the rudder of the plane to provide the results described herein.

Referring to FIG. 2, the airplane 41 operates and functions similarly to the airplane 11 of FIG. 1. In this embodiment the airplane 41 has hinged clam shell-like structures 42 and 43 mounted at the aft end of the tip tanks 44 and 46. Other mechanisms near the wing tips which produce essentially pure drag will function in a similar fashion.

Inasmuch as the internal control components 47, connecting the clam shell-like structures 42 and 43, function substantially the same as the control elements for the variable pitch propellers 18 and 19 of FIG. 1, a detailed discussion in this respect is not believed necessary.

Again it is assumed the airplane 41 is making a left turn during a dive bombing run. The clam shell-like structure 43 is partially open, as indicated by dotted construction in FIG. 2, and the rudder 49 is moved to the right as shown in dotted construction. Thus it will be seen that the rudder 49 will provide a true side force 51 functioning to effect an azimuthal change in its flight path without any substantial rolling or sideslip motion being imparted to the airplane 41.

Figure 3:
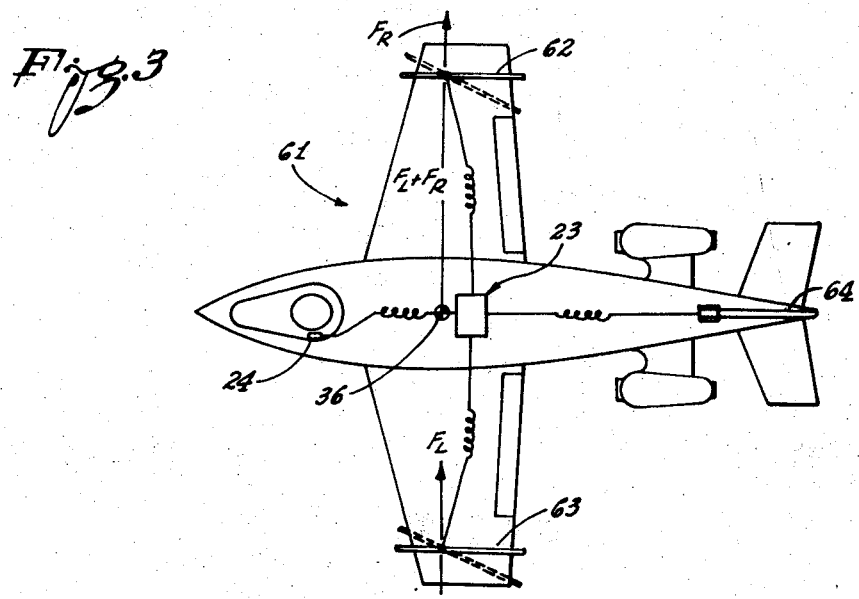
FIG. 3 is a plan view of the airplane incorporating control surfaces which produce side forces acting through or near the center of gravity (c.g.) of the plane to provide the results described herein.

Referring to FIG. 3, the airplane 61 shown in this figure operates and functions similarly to the airplane 11 of FIG. 1. The airplane 61 embodies pivotally mounted fences 62 and 63 which are rotated equally clockwise or counter-clockwise about a point causing the side forces $F_L$ and $F_R$ to pass through the center of gravity 36 of the airplane 61.

Utilizing forces created by the fences 62 and 63 functioning in the manner of the previous embodiments, has an advantage over the embodiments shown in FIGS. 1 and 2 in that a true side force is provided acting through the center of gravity of the airplane 61 without the use of the rudder 64.

I claim:

1. In an airplane having a pair of variable pitch propellers, a rudder, a pitch changing actuator for each of said propellers and a rudder actuator, the combination comprising:
   a. a pilot's control member movable in either of two substantially opposite direction from a neutral position,
   b. on-off switch means accessible to the pilot,
   c. side force control means coupled to said pilot's control member through said on-off switch means, and
   d. means connecting the output of said control means to said pitch changing actuators and to said rudder actuator,
   e. said side force control means responsive to movements of said pilot's control member functioning to change the pitch of at least one of said propellers to produce yaw in one direction and to move said rudder in the other direction to cancel the yaw moment of said propellers, whereby aerodynamic forces are present providing a true side force acting at the center of gravity of said airplane insuring the latter will change its azimuthal flight path without any substantial rolling or sideslip.

2. In an airplane which includes a rudder and opposite wing mounted variable-pitch propellers, apparatus operable to perform a flat turn comprising:
   a. means interconnecting the control means for said rudder with the pitch control means for said propellers,
   b. a manually-controlled switch operable to actuate said interconnecting means from an inoperable to an operable condition,
   c. a pilot's turn controller connected to said interconnecting means, and
   d. side force control means in said interconnecting means responsive to said turn controller when said interconnecting means is operable to differentially change the pitch of said propellers in one yaw-producing direction and to deflect said rudder in the opposite yaw-producing direction,
   e. whereby the lateral side force on said airplane from said rudder deflection combined with an initial yawing motion started by said propeller pitch differential operation can produce an essentially wings-level flat turn of said airplane.

* * * * *